United States Patent [19]

Singer

[11] Patent Number: 5,040,760
[45] Date of Patent: Aug. 20, 1991

[54] SUPPORT FOR COMPUTER KEYBOARD

[75] Inventor: Samuel Singer, Indiana, Pa.

[73] Assignee: Andray Mining Company, Indiana, Pa.

[21] Appl. No.: 552,488

[22] Filed: Jul. 16, 1990

[51] Int. Cl.$^5$ ............................................. F16M 13/00
[52] U.S. Cl. .................................... 248/284; 248/918; 248/924; 248/172; 248/670
[58] Field of Search ............... 248/678, 670, 664, 284, 248/287, 172, 173, 918, 924, 442.2, 281.1; 400/717, 718; 108/102, 112, 111; 312/208, 281

[56] References Cited

U.S. PATENT DOCUMENTS

| | | | |
|---|---|---|---|
| 1,074,430 | 9/1913 | Hill | 248/442.2 X |
| 1,108,687 | 8/1914 | Boorman | 248/442.2 |
| 4,635,893 | 1/1987 | Nelson | 400/718 X |
| 4,717,112 | 1/1988 | Pirkle | 248/918 X |
| 4,805,859 | 2/1989 | Hudson | 248/678 X |
| 4,863,140 | 9/1989 | Schriner | 248/918 X |
| 4,901,972 | 2/1990 | Judd et al. | 248/918 X |

FOREIGN PATENT DOCUMENTS 8403573  9/1984  World Int. Prop. O. .......... 248/918

OTHER PUBLICATIONS

Global Computer Supplies Catalog, Mar. 1990, pp. 73–75.

Great Lakes Elec. Dist., Inc. flyer, Mar. 1, 1990.

Primary Examiner—Karen J. Chotkowski
Attorney, Agent, or Firm—R. V. Westerhoff

[57] ABSTRACT

A support for a keyboard for a computer resting on spaced apart feet on a narrow support surface includes two articulated elongated members which are spaced apart laterally the distance between the feet on the computer by cross-braces. The first end sections of the elongated members are placed on the support surface under the spaced apart feet of the computer to cantilever the middle sections and second end sections out over the edge of the support surface with the middle sections extending generally downward adjacent the edge of the support surface and the second end sections extending generally laterally outward from the middle sections to form spaced part supports for the keyboard. Preferably, the middle sections of the elongated members are hinged to the end sections for adjusting the height at which the keyboard is supported and to rotate the middle sections to a generally horizontal position with the second end sections extending generally upward to form a cradle for stowing the keyboard when not in use with the keys facing the computer. Also preferably, the second end sections are hinged to the middle sections such that through adjustment of the two sets of hinges the keyboard can be set to a range of heights.

9 Claims, 2 Drawing Sheets

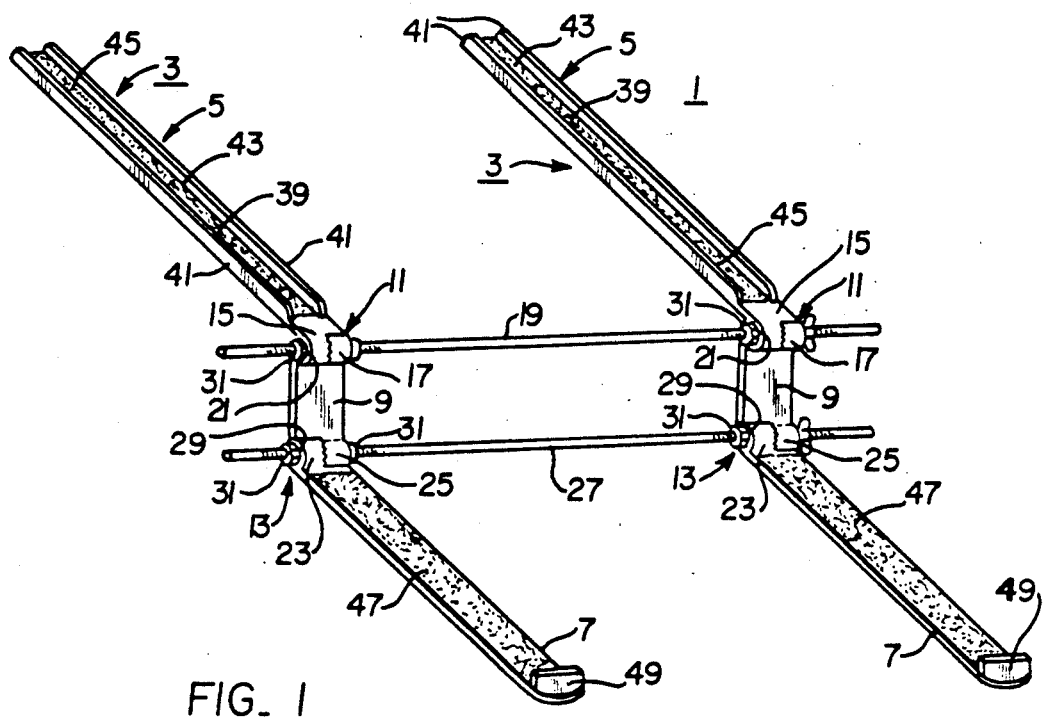
FIG. 1
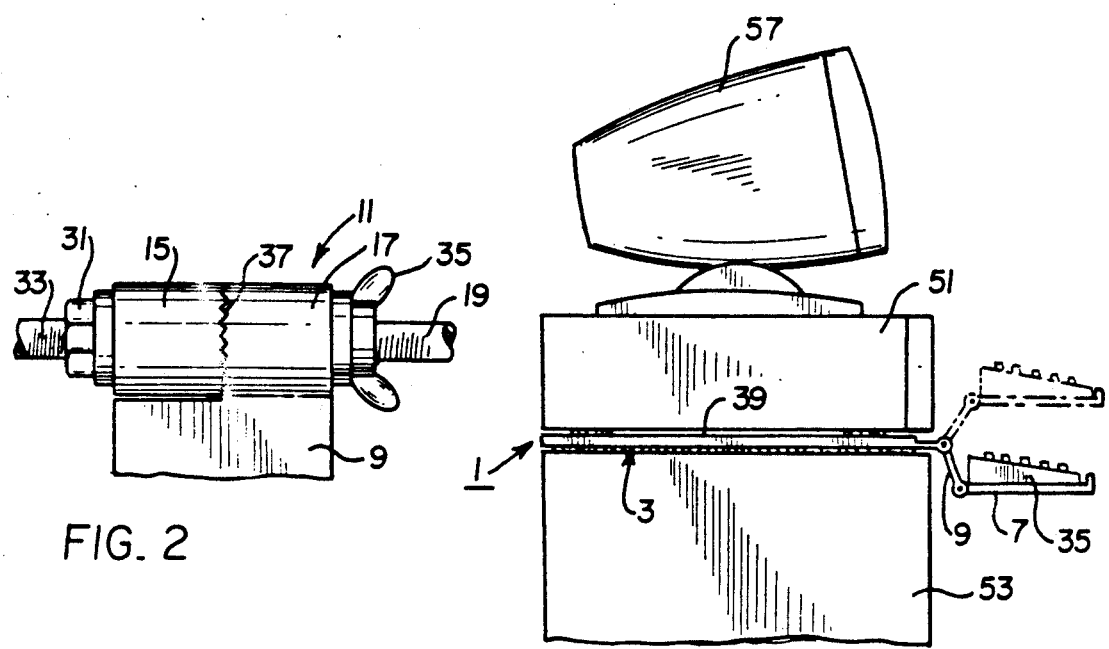
FIG. 2
FIG. 3

SUPPORT FOR COMPUTER KEYBOARD

BACKGROUND OF INVENTION

1. Field of Invention

This invention relates to apparatus supporting a freestanding keyboard for a digital computer resting on spaced apart feet adjacent the edge of a support surface and retained in position by the weight of the computer.

2. Background Information

A common problem with desk top computers is that the surface available is typically not large enough to comfortably accommodate the computer, the monitor and the keyboard. This is particularly true when the computer is supported on a credenza or other narrow piece of furniture. Many solutions have been proposed for this problem. Some desks have a shallow drawer in which the keyboard is stored and pulled out for use. Freestanding drawer units are available which are placed on top of the desk under the computer. One difficulty with such units is that typically the monitor is placed on top of the computer and the height of the drawer unit raises the monitor to an uncomfortable level. Other keyboard supports are mounted under the desk and swing out for use. These devices require screwing supports to the desk. These presently available keyboard supports are bulky, in some instances require installation, and are all expensive.

There remains a need for an improved support for a freestanding keyboard for a digital computer resting on a narrow support surface. More particularly, there is a need for such a keyboard support which is adjustable for a range of computers.

There is another need for such keyboard support which is adjustable in the height at which the keyboard is supported.

There is a further need for such a support which protects the keyboard in a stowed position when not in use.

There is also a need for such a keyboard support which does not require attachment to the desk or other support for the computer.

There is a still further need for such a keyboard support which does not appreciably raise the computer or monitor.

There is an additional need for such a keyboard support which is low in cost and durable.

SUMMARY OF THE INVENTION

These and other needs are satisfied by the invention which is directed to apparatus for supporting a keyboard for a digital computer resting on spaced apart feet adjacent the edge of a support surface which includes a pair of spaced apart elongated members. Connecting means secure the two elongated members together and set the distance therebetween for placement of the first end sections of the two elongated members on the support surface under the spaced apart feet of the digital computer with the middle sections and the second end sections cantilevered out beyond the edge of the support surface. The middle sections form an angle with the first end sections and the second end sections extend generally outward from the middle sections to form spaced apart supports for supporting the keyboard. The cantilevered middle sections and second end sections of the elongated members, and the keyboard supported thereby, are held in position by the weight of the computer.

In the preferred embodiment of the invention, the middle sections of each of the elongated members are connected to the first end sections by hinges and are rotatable about these hinges from a deployed position in which the middle sections extend downward adjacent the edge of the support surface, to a generally horizontal stowed position with the second end sections extending generally vertically upward to form a cradle in which the keyboard is stowed with the keys facing the digital computer and therefore protected. Also preferably, the middle sections of each of the elongated members are connected to the second end members by hinges, so that through coordinated adjustment of the two hinges in each elongated member, the keyboard can be supported at a desired angle to the horizontal over a range of vertical heights.

The connecting means joining the two elongated members is adjustable to set the lateral distance between the elongated members to the space between the feet on a computer so that the keyboard support in accordance with the invention is adaptable for use with various desk top computers. In one embodiment of the invention, the connecting means are in a form of rods extending through the hinges between the middle sections and the end sections. In another embodiment of the invention, the elongated members have transverse dovetail slots engaged by complementary shaped cross braces which frictionally engage the slots to fix the distance between the elongated members. In another exemplary embodiment of the invention, the cross braces have a series of longitudinally spaced apertures which are engaged by pins on the elongated members to fix the distance between the elongated members to standard spacings between feet on desk top computers.

Also in the preferred embodiment of the invention, the first elongated members comprise elongated channels for receiving the feet of the computer. In addition, the first elongated members are provided on both the upper and lower surfaces, and the second end sections on which the keyboard rests are provided with non-skid surfaces.

BRIEF DESCRIPTION OF THE DRAWINGS

A full understanding of the invention can be gained from the following description of the preferred embodiments when read in conjunction with the accompanying drawings in which:

FIG. 1 is a isometric view of a first embodiment of a computer keyboard support in accordance with the invention.

FIG. 2 is a fragmentary front view in enlarged scale of a portion of the keyboard support of FIG. 1.

FIG. 3 is a side elevation view illustrating the keyboard support of FIG. 1 in use and supporting a keyboard for a digital computer.

DESCRIPTION OF THE PREFERRED EMBODIMENTS

Figure 4:
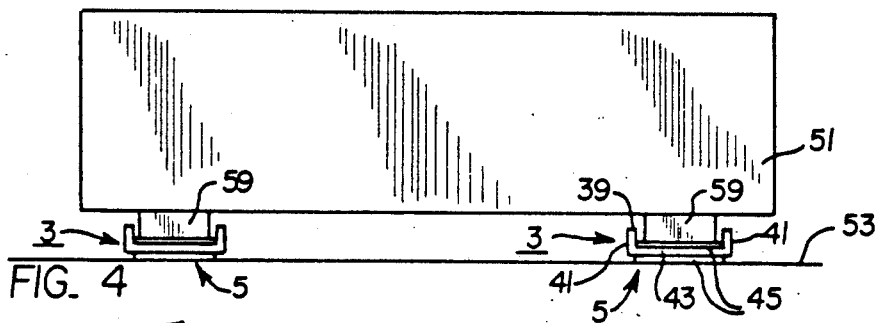
FIG. 4 is a rear elevation view of the arrangement shown in FIG. 3.

Referring to FIGS. 1-4, the computer keyboard support 1 of the invention includes a pair of elongated members 3 each of which includes a first end section 5, a second end section 7 and a middle section 9. The middle sections 9 of the elongated members 3 are pivotally connected to the end members 5 and 7 by hinges 11 and 13, respectively. The hinge 11 comprises overlapping bosses, 15, 17 projecting from the ends, and extending over half the width of, adjacent ends of the first end sections 5 and the middle section 9, respectively. A rod 19 extends through aligned lateral bores 21 through the bosses 15 and 17 to form a common pivot pin for the hinges 11 in the first and second elongated members.

Similarly, the hinges 13 comprise overlapping bosses 23 and 25 projecting from the ends of the second end sections 7 and the other end of the middle section 9, respectively, and the rod 27 extending through transverse aligned bores 29 in the bosses 23 and 25 of each of the elongated members 3. The rods 19 and 27 not only form common pivots for the hinges 11 and 13, but also secure the two elongated members 3 together and set the distance between them. The distance between the elongated members 3 is set by stop nuts 31 which are threaded onto threads 33 on the rods 19 and 27. As best seen in FIG. 2, the elongated members are positioned against the stop nuts, and wing nuts 35 are threaded along the threads 33 on the rods 19 and 27 to clamp the bosses forming the hinges together, and therefore, to fix the spacing between the elongated members and to lock the hinges 11 and 13 in a desired angular position. It is preferred that the bosses 15 and 17 and 23 and 25 forming the hinges 11 and 13 have serrated confronting surfaces 37 to positively fix the hinges 11, 13 at a desired angle.

In a preferred form of the invention, the first end sections 5 of the elongated members 3 are channel members 39 having parallel legs 41 joined by a web 43. The width of the channel is sufficient to accommodate the lateral dimension of the feet on a digital computer. Also preferably, the web 43 of the channels 39 are lined on both sides with strips 45 of non-skid material such as a synthetic rubber strip glued to the web 43.

The upper surface of the second end sections 7 of the elongated members 3, on which the keyboard is supported as will be seen, are also covered with strips of non-skid material 47 which can be glued in place. In addition, the free ends of the second end section 7 are turned up to form flanges 49 which also aid in holding the keyboard in place. The keyboard support 1 is shown in use in FIGS. 3 and 4. As can be seen from the side elevation view of FIG. 3, a computer 51 is resting on a narrow credenza 53 which is barely as deep as the computer leaving no room for the keyboard 55. As is typical, the monitor 57 is supported on top of the computer 51. The keyboard support 1 of the invention is placed on top of the credenza or table 53 with the spacing between elongated members 3 set so that the channels 39 are aligned with the spaced apart feet 59 on the computer 51, as best seen in the rear view shown in FIG. 4. The weight of the computer 51, and the monitor 57 if placed on top of the computer, supports the device 1 with the middle sections 9 and the second end sections 7 of the elongated members 3 cantilevered out beyond the edge of the credenza or table 53. The hinges 11 and 13 may be adjusted and locked with the middle sections 9 extending generally downward adjacent the edge of the credenza or table 53 and with the end sections 7 extending at a desired angle to the horizontal outward as shown in full in FIG. 3. The keyboard 55 is supported on the second end sections 7 as shown. Generally, a more comfortable working level is achieved by having the keyboard below the top surface of the credenza or table 53. However, through adjustment of the hinges 11 and 13, the keyboard 55 can be set at a range of heights including levels above the top of the credenza or table 53 as shown in phantom in FIG. 3.

Figure 5:
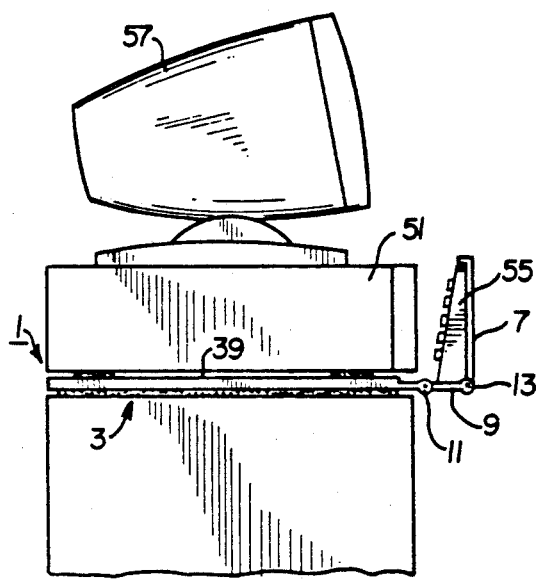
FIG. 5 a side elevation view similar to FIG. 3, showing the keyboard support of FIG. 1 in the stowed position.

When the keyboard is no longer needed, it can be stowed by rotating the middle sections 9 about the hinges 11 to a generally horizontal position, and, if necessary, rotating the second end sections 7 about the hinges 13 to a substantially vertical position, to form a cradle which supports the keyboard with the keys facing the computer as shown in FIG. 5. In this stowed position the keyboard is out of the way and the keys are protected from damage by facing the computer 51.

Figure 6:
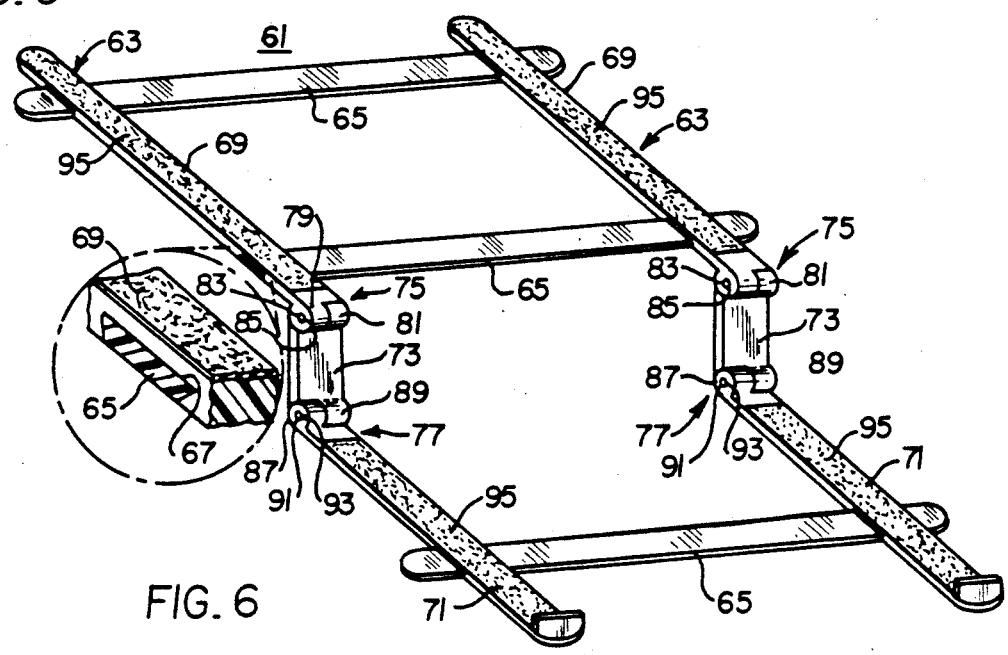
FIG. 6 is an isometric view of another embodiment of support in accordance with the invention with a portion shown in enlarged scale.

Another keyboard support 61 in accordance with the invention is shown in FIG. 6. In this embodiment, the two elongated members 63 are connected by three cross braces 65 which engage dovetail slots 67 in the first end sections 69 and the second end sections 71. The cross braces 65 have a trapazoidal cross section which fits snugly in the dovetail slot to frictionally fix the spacing between the elongated members 63. As in the first embodiment, middle sections 73 are pivotally connected between the end section 69 and 71 of the elongated member 63 by hinges 75 and 77, respectively. The hinge 75 is formed by the boss 79 on the first end section 69 and the overlapping boss 81 on the middle section 73. A hinge pin 83 snugly fits in bores 85 through the bosses 79 and 81 to form a friction lock for the hinge 75. Similarly the hinge 77 is formed by the boss 87 on the second end section 71, boss 89 on the middle section 73 and hinge pin 91 through bores 93 in the bosses 87 and 89. Positive locking devices such as shown in the embodiment in FIG. 1 or other devices can be used to lock the hinges 75 and 77 at desired angles. Again, strips 95 of non-slip material can be glued to the top and bottom surfaces (not shown) of the first end section 69 and to the top surfaces of the second end sections 71.

Figure 7:
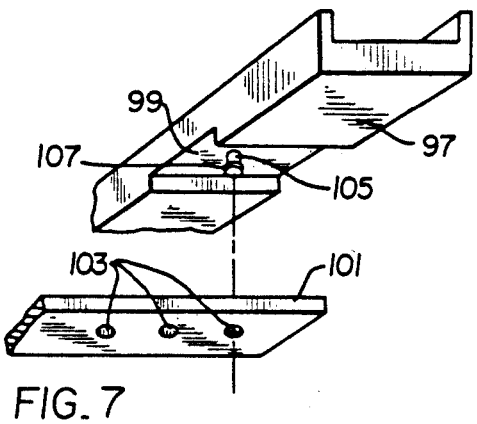
FIG. 7 is a fragmentary exploded view a portion of still another embodiment of the invention.

FIG. 7 illustrates another keyboard support in which the elongated members 97 have transverse slots 99 for receiving the cross braces such as 101. The cross braces 101 have a number of longitudinally distributed apertures 103 which snap over a pin 105 in the slot 99 to lock the elongated members at discrete spacings. The pin 105 may be provided with an annular lip 107 which provides an interference fit in the apertures 103.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for supporting a keyboard for a digital computer resting on spaced apart feet adjacent an edge of a support surface, said keyboard having a predetermined height, a depth greater than said height and keys on an upper surface thereof, said apparatus comprising:

a pair of spaced apart elongated members each having a first end section, a middle section and a second end section, connecting means connected between said first and second elongated members setting a lateral distance therebetween for placement of the first end sections of the elongated members on said support surface under the spaced apart feet of said digital computer with said middle sections and second end sections cantilevered out beyond said edge of said support surface with said middle sections forming an angle with the first end section and said second end sections extending generally outward from said middle sections to form spaced apart supports for supporting said keyboard, hinge means connecting said middle section of each of said elongated members to said first end section, said middle sections having a length at least as great as the height of the keyboard, and being rotatable about said hinge means from a deployed position in which said middle sections extend generally downward adjacent the edge of said support surface to a substantially horizontal stowed position with said second end sections extending generally vertically upward, said middle sections and said second end sections forming in the stowed position, a cradle stowing said keyboard with the keyboard supported by said middle sections and with said keys thereon facing said digital computer, and releasable lock means locking said hinge means in selected angular positions including said stowed position, said connecting means including a rod having threads thereon extending between said hinge means on said first and second elongated members, first and second stop members threaded onto the threads of said rod and spaced part to set said distance between the first and second elongated members and locking means including first and second locking nuts threadably onto said threaded rod to clamp the first and second elongated members against teh first and second stop members respectively.

2. Apparatus for supporting a keyboard for a digital computer resting on spaced apart feet adjacent an edge of a support surface, said keyboard having a predetermined height, a depth greater than said height and keys on an upper surface thereof, said apparatus comprising:

a pair of spaced apart elongated members each having a first end section, a middle section and a second end section, connecting means connected between said first and second elongated members setting a lateral distance therebetween for placement of the first end sections of the elongated members on said support surface under the spaced apart feet of said digital computer with said middle sections and second end sections cantilevered out beyond said edge of said support surface with said middle sections forming an angle with the first end sections and said second end sections extending generally outward from said middle sections to form spaced apart supports for supporting said keyboard, and hinge means connecting said middle section of each of said elongated members to said first end section, said middle sections having a length at least as great as the height of the keyboard, and being rotatable about said hinge means from a deployed position in which said middle sections extend generally downward adjacent the edge of said support surface to a substantially horizontal stowed position with said second end sections extending generally vertically upward, said middle sections and said second end sections forming in the stowed position, a cradle stowing said keyboard with the keyboard supported by said middle sections and with said keys thereon facing said digital computer, said first end sections of each of said elongated members comprising U-shaped channels having upwardly extending legs separated by a web a distance sufficient to receive therebetween the feet of said digital computer.

3. The apparatus of claim 2 including a non-slip surface in said channels on said web preventing sliding of said feet on the digital computer in said channels.

4. The apparatus of claim 3 including a non-slip surface on the web of said U-shaped channels facing said support surface preventing sliding of the elongated members on the support surface.

5. The apparatus of claim 2 including a non-slip surface on the second end portions of said elongated members supporting said keyboard.

6. Apparatus for supporting a keyboard for a digital computer resting on spaced apart feet adjacent the edge of a support surface, said apparatus comparing:

a pair of spaced apart elongated members each having a first end section, a middle section and a second end section, first hinge means connecting one end of said middle section of each of said elongated members to an end of said first end section, second hinge means connecting an opposite end of said middle section of each of said elongated members to an end of said second end section, and connecting means connected between said first and second elongated members setting an adjustable distance therebetween for placement of the first end sections of the elongated members on said support surface under the spaced apart feet of said digital computer with said middle sections and second end sections cantilevered out beyond said edge of said support surface with said middle sections forming with said first end sections a first adjustable angle set by said first hinge means and with said second end sections extending generally outward from said middle sections and forming with said middle sections a second adjustable angle set by said second hinge means, said second end sections forming spaced apart supports for supporting said keyboard at an adjustable height relative to said support surface set by the first and second hinge means, said connecting means including a first rod extending through said first hinge means on each of said elongated members, a second rod extending through said second hinge means on each of said elongated members, and adjustable stop means on said first and second rods fixing the adjustable distance between said first and second elongated members.

7. Apparatus for supporting a keyboard for a digital computer resting on spaced apart front and rear feet adjacent the edge of a support surface, said apparatus comparing:

a pair of spaced apart elongated members each having a first elongated end section having a length at least spanning the spaced apart front and rear feet on said digital computer, a middle section and a second end section, first hinge means connecting one end of said middle section of each of said elongated members to an end of said first end section, second hinge means connecting an opposite end of said middle section of each of said elongated members to an end of said second end section, and connecting means connected between said first an second elongated members setting an adjustable distance therebetween for placement of each of the first elongated end sections of the elongated members on said support surface under a front foot and a rear foot of said digital computer with said middle sections and second end sections cantilevered out beyond said edge of said support surface with said middle sections forming with said first end sections a first adjustable angle set by said first hinge means and with said second end sections extending generally outward from said middle sections and forming with said middle sections, a second adjustable angle set by said second hinge means, said second end sections forming spaced apart supports for supporting said keyboard at an adjustable height relative to said support surface set by the first and second hinge means, said connecting means including at least two brace members extending transversely between said first and second elongated members and means adjustably locking said brace members to said elongated members to adjustably set the adjustable distance between said first and second elongated members to align said first elongated end sections with the feet on said computer.

8. The apparatus of claim 7 wherein the first and second end sections of each of said elongated member have aligned transverse dovetail slots and said brace members have cross sections which slid snugly within said dovetail slots to adjustably set and maintain the said spacing between said first and second elongated members.

9. The apparatus of claim 7 wherein said elongated members have a pin projecting transversely to said brace member, and wherein said brace members have a series of apertures for engaging said pins spaced longitudinally along said brace members to provide adjustable spacing between said first and second elongated members.

* * * * *

UNITED STATES PATENT AND TRADEMARK OFFICE
CERTIFICATE OF CORRECTION

PATENT NO. : 5,040,760
DATED : August 20, 1991
INVENTOR(S) : SAMUEL SINGER

It is certified that error appears in the above-identified patent and that said Letters Patent is hereby corrected as shown below:

Column 2, line 65, before "support" insert --the keyboard--.

Claim 1, column 5, line 12, "section" should be --sections--.

Claim 1, column 5, line 36, "part" should be --apart--.

Claim 1, column 5, line 39, "threadably" should be --threadable--.

Claim 1, column 5, line 41, "teh" should be --the--.

Claim 7, column 7, line 4, "an" should be --and--.

Signed and Sealed this

Thirtieth Day of November, 1993

Attest:

BRUCE LEHMAN

Attesting Officer     Commissioner of Patents and Trademarks